United States Patent
Sang et al.

(10) Patent No.: US 8,824,303 B2
(45) Date of Patent: Sep. 2, 2014

(54) MULTI-RADIO COEXISTENCE SIGNALING

(71) Applicant: Broadcom Corporation, Irvine, CA (US)

(72) Inventors: Aimin Sang, San Diego, CA (US); Kamesh Medapalli, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 85 days.

(21) Appl. No.: 13/693,871

(22) Filed: Dec. 4, 2012

(65) Prior Publication Data

US 2014/0140381 A1 May 22, 2014

Related U.S. Application Data

(60) Provisional application No. 61/728,175, filed on Nov. 19, 2012.

(51) Int. Cl.
*H04L 12/26* (2006.01)
*H04J 3/06* (2006.01)
*H04B 1/38* (2006.01)

(52) U.S. Cl.
CPC ...................................... *H04B 1/38* (2013.01)
USPC ............ 370/236; 370/252; 370/350; 370/503

(58) Field of Classification Search
CPC . H04W 24/02; H04W 28/02; H04W 56/0045; H04J 3/00; H04J 3/06; H04J 3/0602; H04J 3/0635; H04J 3/0638; H04J 3/0647; H04J 3/065; H04J 3/0652; H04J 3/0655; H04J 3/0658; H04J 3/0661; H04J 3/0664; H04J 3/0667; H04J 3/0682; H04J 3/0685; H04J 3/0691; H04J 3/0694

USPC ......... 370/229–231, 235–236, 252, 319–321, 370/324, 326, 330, 336–337, 345, 350, 370/395.4, 436, 442, 478, 498–522

See application file for complete search history.

(56) References Cited

U.S. PATENT DOCUMENTS

| 7,623,552 | B2 * | 11/2009 | Jordan et al. | 370/503 |
|---|---|---|---|---|
| 8,145,247 | B2 * | 3/2012 | Fullam | 455/502 |
| 8,243,714 | B1 * | 8/2012 | Hilton et al. | 370/350 |
| 8,457,684 | B2 * | 6/2013 | Flanangan | 455/552.1 |
| 2003/0002459 | A1 * | 1/2003 | Igarashi et al. | 370/330 |
| 2007/0053340 | A1 * | 3/2007 | Guilford | 370/350 |
| 2009/0052431 | A1 * | 2/2009 | Kroener et al. | 370/350 |

* cited by examiner

*Primary Examiner* — Tri H Phan
(74) *Attorney, Agent, or Firm* — Foley & Lardner LLP; Christopher J. McKenna; Paul M. H. Pua (57) ABSTRACT

A method and apparatus relate to coexistence of multiple RF subsystems on a communication device. An apparatus may include a plurality of radio frequency (RF) subsystems configured to receive or transmit communication signals; and an interface for communication between a first RF subsystem of the plurality of RF subsystems and at least a second RF subsystem of the plurality of subsystems. The first RF subsystem can be configured to generate a timing offset for a coexistence signal, the timing offset being indicative of a difference between a time of generation of a signal and the time of an event associated with the signal. The timing offset can comprise a fixed offset generated based on at least one of a reference time from a periodic interrupt or direct access of a timer; and an offset adjustment based on a distance between the apparatus and a base station associated with the first RF subsystem.

26 Claims, 7 Drawing Sheets

MULTI-RADIO COEXISTENCE SIGNALING

RELATED APPLICATIONS

This application claims priority under 35 U.S.C. §119(e) to U.S. Provisional Patent Application Ser. No. 61/728,175, titled MULTI-RADIO COEXISTENCE SIGNALING, filed Nov. 19, 2012, which is hereby incorporated by reference in its entirety and for all purposes.

TECHNICAL FIELD

The technical field of the present disclosure relates to mobile wireless communication devices, and in particular, to addressing interference among multiple radio technologies.

BACKGROUND

A wireless communication device, such as a cellular telephone, two-way radio, personal digital assistant (PDA), personal computer (PC), laptop computer, home entertainment equipment, radio frequency (RF) identification (RFID) reader, RFID tag, etc. may communicate directly or indirectly with other wireless communication devices. Such communication devices, which may be mobile and/or stationary, may include a plurality of wired and/or wireless interfaces to enable use of various standards for communicating data. For example, mobile devices may enable cellular connectivity through mobile technologies, such as Global System for Mobile Communications (GSM), General Packet Radio Service (GPRS), Enhanced Data Rates for GSM Evolution (EDGE), Universal Mobile Telecommunications System (UMTS), Code Division Multiple Access 2000 (CDMA2000), and Long Term Evolution (LTE), as well as interfaces to communicate using additional technologies, such as Bluetooth, Wireless local area networks (WLAN), Worldwide Interoperability for Microwave Access (WiMAX) and Global Navigation Satellite Systems (GNSS) such as GPS, GLONASS or Galileo.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

In order to provide users the freedom to communicate, transmit and receive data, through various communication links and networks, wireless communication devices have evolved from utilizing, e.g., a single communication standard (and associated band(s)) to utilizing multiple radio transceivers and antennas that operate using multiple standards and multiple bands, e.g., dual-band, tri-band, and quad-band devices. For example, a cellular telephone may have traditional cellular voice capabilities by operating on, e.g., a GSM band or a CDMA band, while also having the ability to engage in Bluetooth® and WiFi™ communications.

Figure 1:
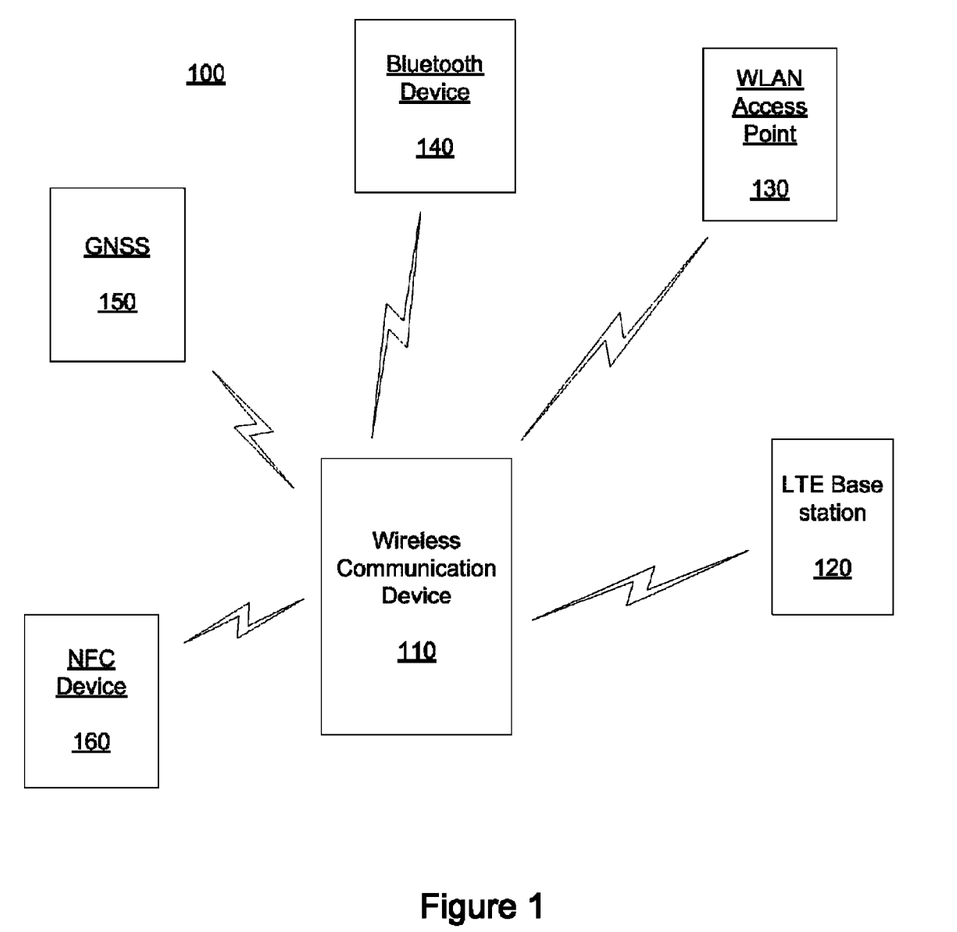
FIG. 1 is an example schematic representation of a communication environment for a communication device.

FIG. 1 illustrates an example communication environment 100 comprising a communication device 110 that is operable to support a plurality of wireless interfaces and capable of electronic communication with other entities. As illustrated in FIG. 1, the communication device 110 may be capable of communicating with an LTE base station 120 for cellular voice and/or data communication. Of course, those skilled in the art will appreciate that the LTE base station 120 may be replaced with nodes for other cellular technologies (e.g., CDMA, Wideband CDMA (WCDMA), CDMA1000, High-Speed Downlink Packet Access (HSDPA), GSM, GPRS, EDGE, and UMTS). The communication device 110 may also be capable of communicating with a wireless local area network (WLAN) access point 130 to connect to, for example, other devices connected to the WLAN. Additionally, the communication device 110 may be capable of communicating with a Bluetooth® (BT) device 140. In this regard, the communication device 110 and the BT device 140 may communicate directly with each other via the Bluetooth® protocol. Also, as illustrated in FIG. 1, the communication device 110 may be capable of receiving signals from a global navigation satellite system (GNSS) unit 150, such as a Global Positioning Satellite (GPS). Of course, the communication device 110 may be configured and capable of communicating with other devices, such as WiMAX, etc., that are not illustrated in FIG. 1. The communication device 110 may also be configured to communicate with a Near Field Communication (NFC) device 160 via the NFC protocol.

The communication device 110 can include suitable logic, circuitry, interfaces and/or code that may enable communications via a plurality of wireless interfaces, utilizing one or more radio transceivers, as described in greater detail below with reference to FIG. 2. The communication device 110 may be operable to execute various tasks and/or applications requested by a user of the communication device 110. Such tasks and/or applications may require interaction with one or more other entities, such as those illustrated in FIG. 1, via one or more wireless interfaces.

Thus, the communication device 110 may enable connectivity via a plurality of available networks and/or wireless interfaces, which may be desirable to perform requested tasks. During wireless communication by the communication device 110, RF signals may be transmitted and/or received to facilitate data communication and/or signaling utilizing one or more of the supported wireless interfaces in the communication device 110 and utilizing one or more RF subsystems that enable use of one or more antenna to facilitate the RF communications. For example, during communication between the communication device 110 and the BT device 140, Bluetooth® RF signals comprising voice, video and/or data packets may be communicated between the communication device 110 and the BT device 140. Similarly, the communication device 110 may be operable to perform WLAN, cellular and/or other types of RF communication with the WLAN access point 130, the LTE base station 120 or other devices, respectively, which can be supported by the communication device 110.

Each type of RF communication can be subject to specific RF protocol requirements. For example, WLAN RF communication based on the 802.11 protocol requirements may be performed only at specific frequency bands, for example the 2.4 GHz and/or 5 GHz bands. Bluetooth® RF communication may also occur in the 2.4 GHz band. Because some of the frequency bands utilized by various wireless interfaces may overlap, simultaneous communication based on the wireless communication protocols may be limited by interference caused by use of the same and/or adjacent frequencies. For example, Bluetooth® RF transmission at about 2.4 GHz via the communication device 110 may cause interference with 802.11 based WLAN RF reception in the communication device 110 where the 802.11 WLAN RF signals are transmitted by a source device within the 2.4 GHz band.

In various embodiments, the communication device 110 can be configured to provide for coexistence of concurrent RF communication by the communication device 110. Coexistence solutions enable multiple RF subsystems to operate within the same device, such as the communication device 110. The coexistence may be based on the existence and/or use of sufficient isolation between the RF subsystems preventing or limiting interference caused by an RF subsystem to other RF subsystems such that concurrent RF transmission and/or reception operations may be performed without any additional processing and/or management. Coexistence may also be based on time domain based techniques, using, for example, arbitration based scheduling.

Figure 2:
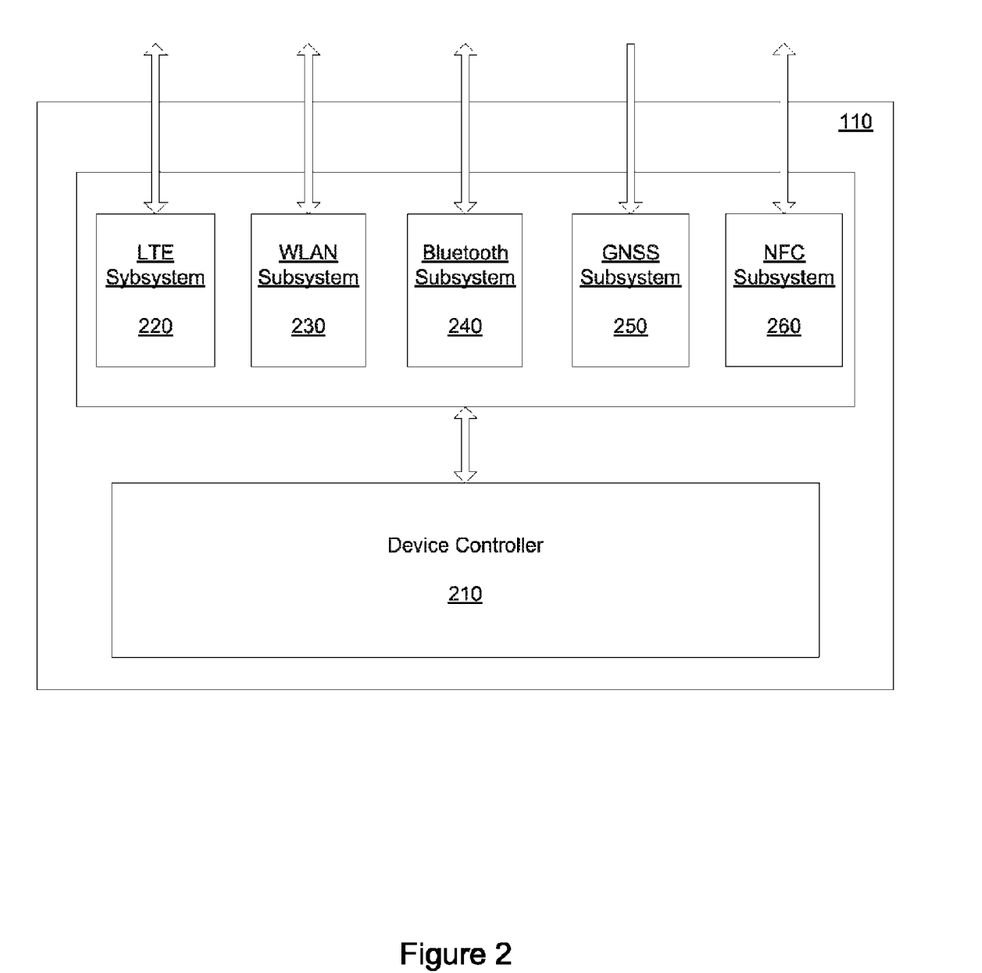
FIG. 2 is a schematic illustration of an example communication device.

Referring now to FIG. 2, an example embodiment of the communication device 110 is schematically illustrated. As illustrated in FIG. 2, the communication device 110 can include a device controller 210 and a plurality of RF subsystems (i.e. LTE subsystem 220, WLAN subsystem 230, Bluetooth® subsystem 240, GNSS subsystem 250 and/or NFC subsystem 260). Of course, those skilled in the art will understand that the communication device 110 may include numerous other components which are not illustrated in FIG. 2 for sake of simplicity. For example, the communication device 110 may include one or more antenna, memory, power system, etc. The device controller 210 may comprise suitable logic, circuitry, interfaces and/or code that may be operable to provide management and/or control functionality of the communication device 110 to support RF transmission and/or reception operations during communication through one or more of the plurality of RF subsystems. In this regard, the device controller 210 may include a central processor, a memory and various other components.

The RF subsystems may include wireless interfaces which facilitate wireless communication for specific protocols. For example, the LTE subsystem 220 can comprise an interface for communication with an LTE base station. Similarly, the WLAN subsystem 230, Bluetooth® subsystem 240, GNSS subsystem 250 and NFC subsystem 260 may comprise interfaces for communication with WLAN, Bluetooth®, GNSS and NFC devices, respectively. The RF subsystems (i.e. LTE subsystem 220, WLAN subsystem 230, Bluetooth® subsystem 240, GNSS subsystem 250 and/or NFC subsystem 260) may include various other components, such as an antenna, and may be operable to perform RF transmission and/or reception of signals comprising data and/or control packets for the various wireless communication protocols. The device controller 210 may be operable to control and/or manage the operations of the various RF subsystems.

As illustrated in FIG. 2, the device controller 210 can be communicatively connected to the RF subsystems (i.e., LTE subsystem 220, WLAN subsystem 230, Bluetooth® subsystem 240, GNSS subsystem 250 and/or NFC subsystem 260). Further, the various RF subsystems may be communicatively connected directly or indirectly to each other.

Figure 3:
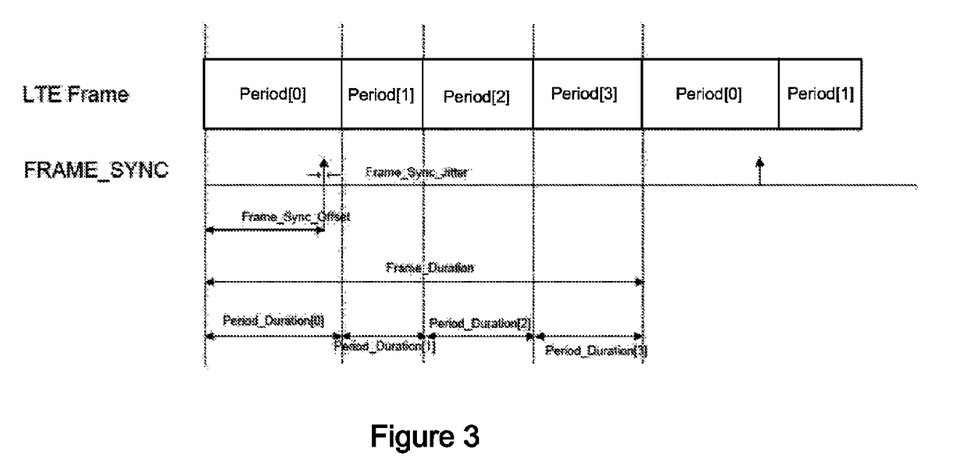
FIG. 3 illustrates an example of a frame structure for an LTE frame.

In accordance with certain embodiments, a framework can be provided to allow coexistence of the multiple RF subsystems on the same communication device. In this regard, the RF subsystems may be configured with a cross-layer partition of measurement-based coexistence modules. Specifically, each of the RF subsystems (i.e., LTE subsystem 220, WLAN subsystem 230, Bluetooth® subsystem 240, GNSS subsystem 250, and NFC subsystem 260) may be so configured. For illustration purposes, the LTE subsystem 220 is illustrated in FIG. 3. Each of the other RF subsystems (i.e., WLAN subsystem 230, Bluetooth® subsystem 240, GNSS subsystem 250 and/or NFC subsystem 260) may be similarly configured.

In devices with multiple RF subsystems such as the device described above, real-time and non-real-time signaling among the devices can facilitate coexistence of the devices. Due to various factors, accurate, real-time signaling can overcome several challenges. For example, in the case of LTE, the mobility of the device can result in a variation, sometimes at a high speed, in the distance between the device and the enhanced Node B (eNB).

One example of the coexistence signaling between the different RF subsystem (e.g., between the LTE subsystem 230 and the Bluetooth® subsystem 240) is described in "Specification of the Bluetooth System," Bluetooth Special Interest Group, Bluetooth Core Specification Addendum 3, rev. 2 (24 Jul. 2012) (hereinafter "BT SIG Specification"). In particular, the example describes time-critical signaling between a Mobile Wireless Standards (MWS) device (e.g., LTE subsystem 220) and a Bluetooth® device (e.g., Bluetooth® subsystem 240). The signals and their direction are described below in Table 1:

TABLE 1

| | |
|---|---|
| FRAME_SYNC | MWS → Bluetooth |
| MWS_RX | MWS → Bluetooth |
| BLUETOOTH_RX_PRI | Bluetooth → MWS |
| BLUETOOTH_TX_PRI | Bluetooth → MWS |
| MWS_PATTERN | MWS → Bluetooth |
| MWS_TX | MWS → Bluetooth |
| 802_RX_PRI | Bluetooth → MWS |
| 802_TX_PRI | Bluetooth → MWS |
| MWS_INACTIVITY_DURATION | MWS → Bluetooth |
| MWS_SCAN_FREQUENCY | MWS → Bluetooth |

It is noted that the examples described herein refer to an LTE subsystem, but the concepts described herein may be applicable to other MWS subsystems as well. Further "802" refers to wideband local area network (WLAN). The definitions of the signals are described in the BT SIG Specification and do not require elaboration here.

In certain examples, the WLAN subsystem 230 and the Bluetooth® subsystem 240 may internally arbitrate the incoming and outgoing coexistence signals from and to the LTE subsystem 220. The FRAME_SYNC signal may be sent by the LTE subsystem 220 to indicate the time of the beginning of an LTE frame.

Figure 4:
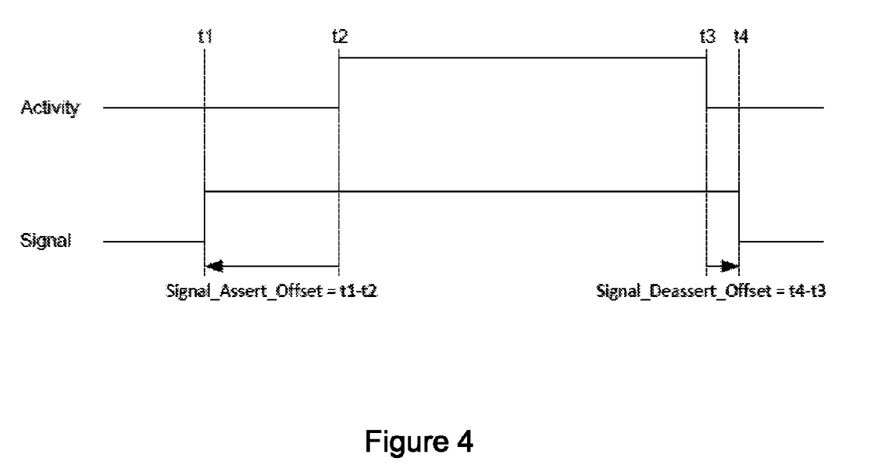
FIG. 4 illustrates an example signal offset relative to the event time.

Each coexistence signal may have an associated offset and a jitter. An offset refers to a static advance notification or delay between the time of the actual event and the time when the signal is issued. Jitter refers to the variations in the timing of each signal from the ideal timing. Reference may be made to FIGS. 3 and 4 for an understanding of these concepts. FIG. 3 illustrates an example frame structure for an LTE frame, and FIG. 4 illustrates an example signal offset relative to the event time. In the example of FIGS. 3 and 4, the offset is indicated by "Frame_Sync_Offset" in FIG. 3, and the jitter is illustrated as "Frame_Sync_Jitter", which is indicated by the arrows surrounding the vertical arrow from the offset.

As illustrated in FIG. 4, the offset can indicate the difference in the times of the signal assertion (t1) and the time of the actual event (t2). Thus t2–t1 can be an assert offset corresponding to a signal of assertion of priority. A deassertion offset can be indicated as t4–t3. In the illustrated example, the assertion offset can be negative, meaning that the signal is asserted before the event. The deassertion offset may be either positive (as illustrated in FIG. 4) or negative. The BT SIG Specification provides example requirements for acceptable offset and jitter values for the different assertion and deassertion signals.

Various embodiments described herein may be implemented in systems employing either Time Division Duplex (TDD) or Frequency Domain Duplex (FDD). In this regard, a brief description of each in the LTE environment is helpful.

Figure 5:
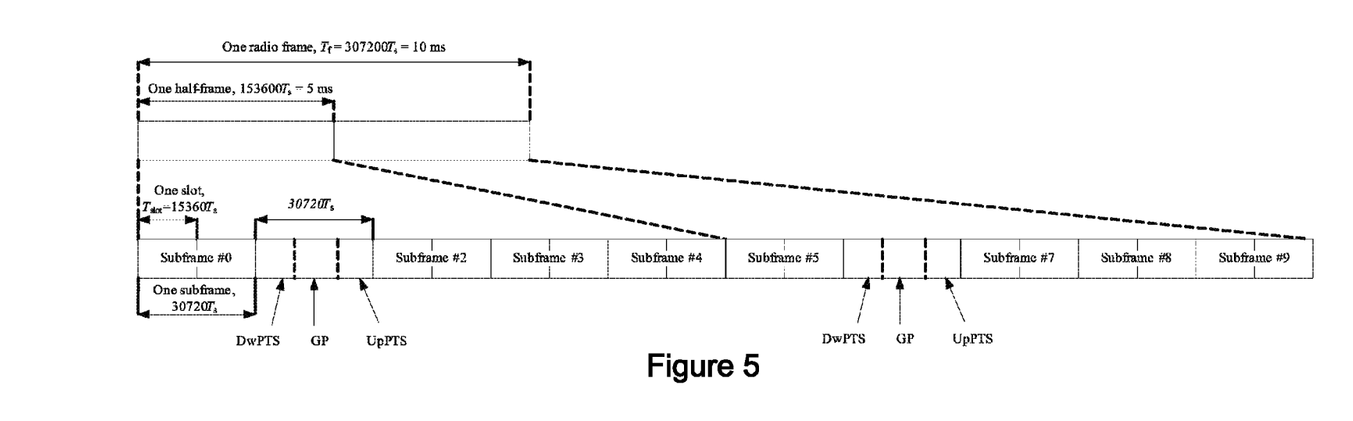
FIG. 5 illustrates an example of a time division duplex (TDD) frame structure.

Referring first to FIG. 5, an example of a time division duplex (TDD) frame structure is illustrated. FIG. 5 illustrates a 10 ms frame, with 10 subframes. Each subframe can be either a download subframe, an upload subframe, or a special subframe. In FIG. 5, Subframe #1 and Subframe #6 are illustrated as special subframes. Each special subframe can include a downlink pilot time slot (DwPTS), a guard period (GP) and an uplink pilot time slot (UpPTS).

Figure 6:
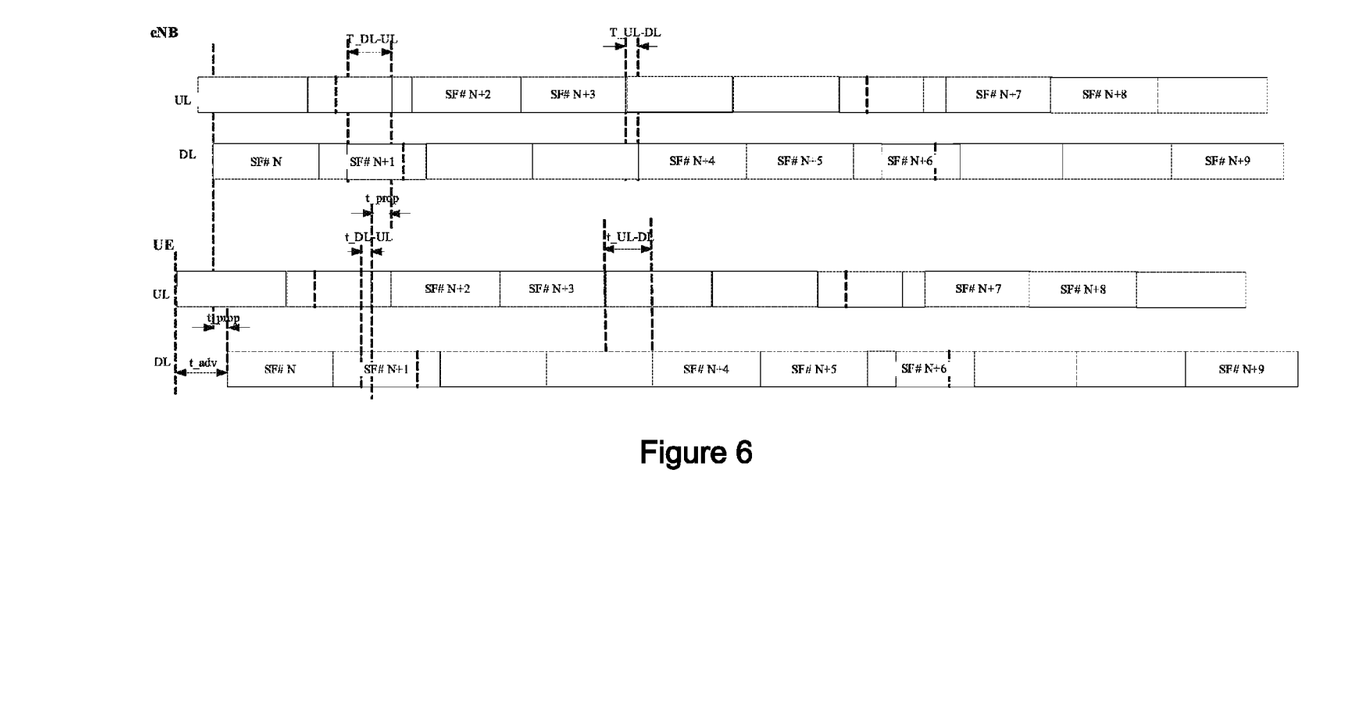
FIG. 6 illustrates an example of timing advance in a TDD frame.

Referring now to FIG. 6, an example of a timing advance in a TDD frame is illustrated. The timing advance (t_adv) is location dependent and can be used to compensate for the delay due to roundtrip propagation between the communication device 110 and the basestation (e.g., eNB). The t_adv may also be used to compensate for any processing delay either at the communication device 110 or at the eNB.

In FIG. 6, the t_adv is the advance of the uplink starting edge with respect to the downlink starting edge at the communication device. The actual time adjustment in response to the Random Access Channel (RACH) in UpPTS may be only about half of t_adv, or approximately equal to the propagation delay t_prop. In general, a greater distance between the communication device and the eNB will result in a larger t_adv. The guard period (GP) in the special frame may be reduced to a value close to zero with the increase of the distance between the communication device and the eNB.

Figure 7:
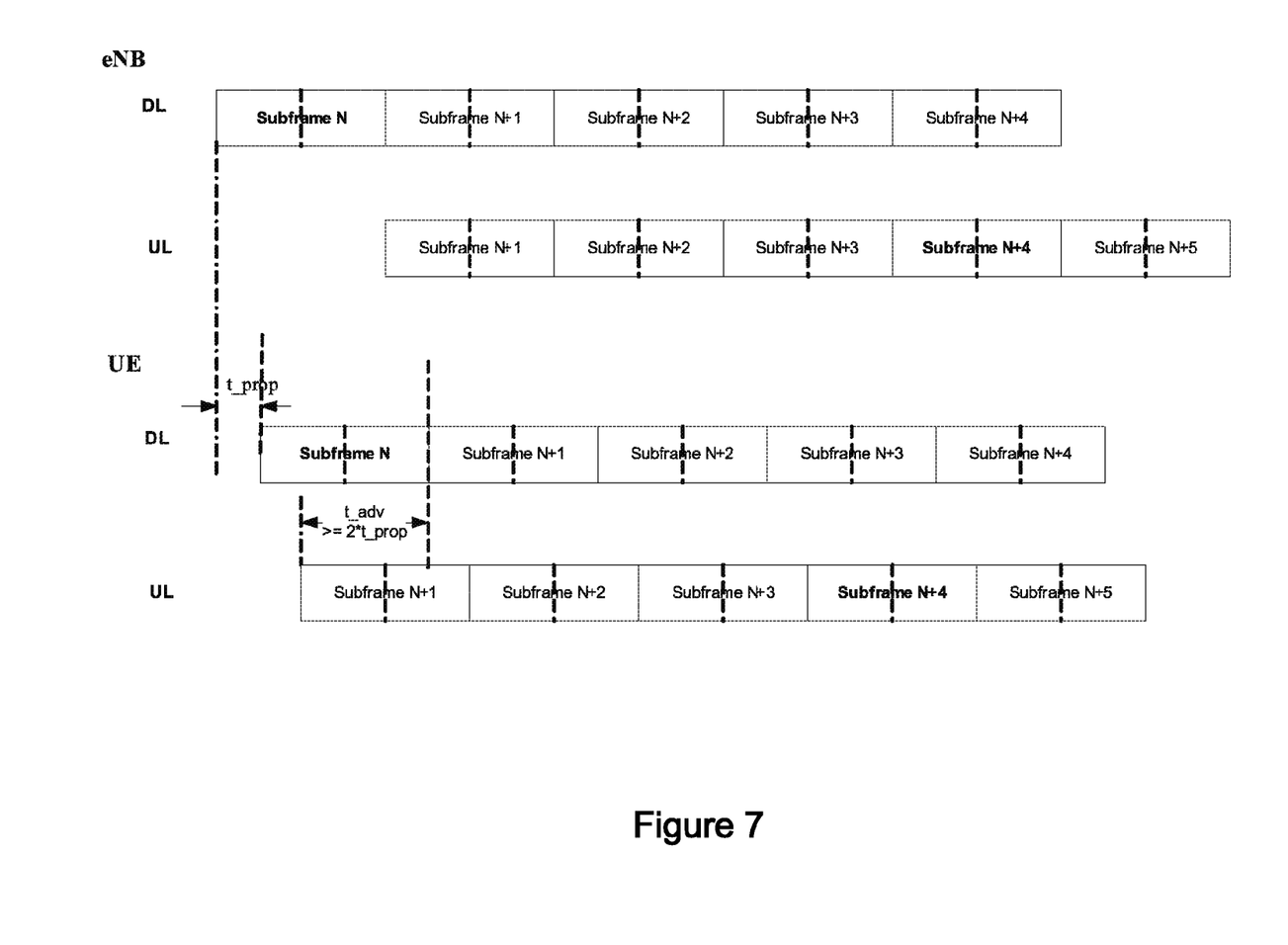
FIG. 7 illustrates an example of timing advance in a frequency division duplex (FDD) frame.

In the case of an FDD system, the frame structure of an LTE frame can be similar to that described above with reference to the TDD system and illustrated in FIG. 5. Further, the t_adv discussed above with reference to FIG. 6 may be used to compensate for location-based round-trip propagation delay between the communication device and an eNB. An example of an FDD frame and time advance is illustrated in FIG. 7.

Figure 8:
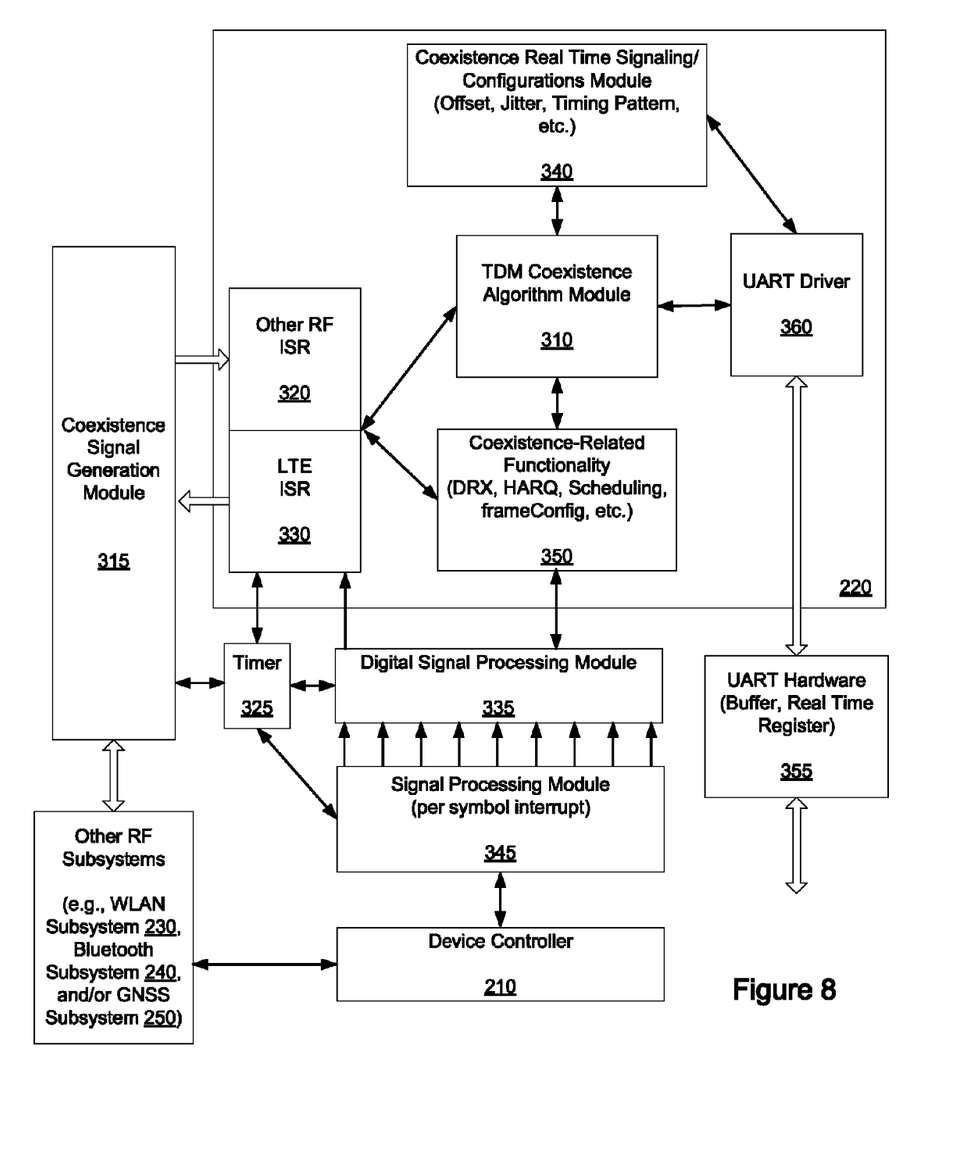
FIG. 8 is a schematic illustration of an example LTE subsystem of the communication device of FIG. 2.

Referring now to FIG. 8, an example embodiment of the LTE subsystem 220 of the communication device of FIG. 2 is schematically illustrated. Of course, those skilled in the art will understand that the LTE subsystem 220 may contain additional components not shown in FIG. 8 for purposes of simplicity. Further, the various components illustrated in FIG. 8 may be implemented in hardware or in firmware.

The LTE subsystem 220 can comprise a coexistence algorithm module 310 that is configured to manage the coexistence of the LTE subsystem 220 with the other RF subsystems (e.g., WLAN subsystem 230, Bluetooth® subsystem 240, GNSS subsystem 250 and/or an NFC subsystem 260). In this regard, the LTE subsystem 220 may receive coexistence signals from the other RF subsystems (e.g., WLAN subsystem 230, Bluetooth® subsystem 240, GNSS subsystem 250 and/or NFC subsystem 260) through a coexistence signal generation module 315. In various embodiments, the coexistence signal generation module 315 may be a general purpose input/output (GPIO) module. In other embodiments, the coexistence signal generation module 315 may be another type of interface, such as a Universal Asynchronous Receiver/Transmitter (UART) interface 360 or a proprietary interface.

Realtime signals to and from the coexistence signal generation module 315 may be handled within the LTE subsystem 220 by the appropriate interrupt subroutines (ISRs). Incoming non-LTE messages (e.g., messages from the coexistence signal generation module 315 to the LTE subsystem 220 related to an RF subsystem other than the shown LTE system 220) can be received by a non-LTE ISR 320. In this regard, the non-LTE ISR 320 may be further divided to separately handle messages from the coexistence signal generation module 315 related to the WLAN subsystem 230 or messages from the coexistence signal generation module 315 related to the BT subsystem 240. Similarly, delivery of LTE-related coexistence messages to the coexistence signal generation module 315 may be handled by an LTE ISR 330.

The coexistence messages handled by the non-LTE ISR 320 and the LTE ISR 330, as well as similar ISR's in the other RF subsystems (e.g., WLAN subsystem 230, Bluetooth® subsystem 240), can be formatted as 8-bit messages in which the first three bits indicate a signal type. Signaling between the LTE subsystem 220 and the GNSS subsystem 250 may be achieved via pulse signals indicating blanking of the power amplifier of the LTE subsystem 220 or fine-time assistance. Referring again to the 8-bit coexistence message format, the remaining five bits could be used for message payload.

FIG. 8 also illustrates the LTE subsystem 220 being provided with various coexistence-related functionality 350. Such functionality may include a scheduler, hybrid automatic repeat request (HARM), discontinuous reception (DRX) or other modules that are common to or may be needed by embedded wireless systems.

The coexistence algorithm module 310 may be configured to access a coexistence real-time signaling/configurations module 340. The coexistence real-time signaling/configurations module 340 may be provided with timing offset and jitter requirements for various types of signals, as well as with other information that may be used by the coexistence algorithm module 310.

The communication device 110 can include a timer 325 that may be a fine-resolution timer. In one embodiment, the timer 325 may be a sub-microsecond, or nano-second, level hardware timer. The timer 325 may be accessible by the LTE subsystem 220 (e.g., via the LTE ISR 330 or the non-LTE ISR 320), as well as by other components of the communication device 110. In one embodiment, the coexistence-related functionality 350 may access the timer 325 directly, rather than through the LTE ISR 320 or a digital signal processing (DSP) module 335, as illustrated in the example of FIG. 8. Thus, the coexistence-related functionality 350 may provide a timing reference (e.g., t1) to the TDM coexistence algorithm module 310.

The communication device 110 can further include a signal processing module 345 which operates to provide interrupts on a per-symbol basis, as indicated by the series of arrows leading from the signal processing module 345 to a digital signal processing (DSP) module 335. The DSP module 335 can provide "Prepare UL Data" interrupts to the LTE ISR 330 on a sub-frame basis. In certain embodiments in which the coexistence-related functionality 350 directly accesses the timer 325 and provides a time reference to the TDM coexistence algorithm module 310, the "Prepare UL Data" interrupt from the DSP module 335 may not be needed, and the LTE ISR 330 may not be needed.

As noted above, in some embodiments, the signals may be exchanged through a UART interface 360. In this regard, the UART interface 360 can process the signals through UART hardware 355, which may include buffers for non-real-time messages and registers for real-time signaling. The UART hardware 355 may be connected to, for example, the other RF subsystems (e.g., WLAN subsystem 230, Bluetooth® subsystem 240, GNSS subsystem 250 and/or NFC subsystem 260).

As indicated in FIG. 8, the device controller 210 for the communication device 110 may be in communication with each of the RF subsystems, as indicated in FIG. 2, as well as the signal processing module 345.

Real-time signals from the LTE subsystem 220 to the other RF subsystems (e.g., WLAN subsystem 230, Bluetooth® subsystem 240, GNSS subsystem 250 and/or NFC subsystem 260) may be generated time-precisely inside an ISR (e.g., LTE ISR 330). In this regard, the DSP module 335 may transmit periodic interrupts to the LTE ISR 330 on a subframe basis, for example. The DSP module 335 may be triggered to send the interrupts by the signal processing module 345 in a time-precise manner since the signal processing module 345 can operate on a per-symbol basis. From the LTE subsystem 220, the signals may be sent to the other RF subsystems through either the coexistence signal generation module 315 or the UART interface 360.

The generation or reception of the real-time coexistence signals may be performed at either a MAC-layer embedded CPU or at the DSP module 335. The UART interface 360 may include a driver that is executed by the DSP module 335. The DSP module 335 may have much finer periodic clock cycles (e.g., at the microsecond level) than the embedded CPU (e.g., at the millisecond level). Further, real-time signaling may be based on intelligence from the coexistence related functionality 350, such as scheduling or DRX, for example. Whether the signal reception/generation is performed at the DSP module 335 or the embedded CPU, the fine resolution timer 325, operating at a sub-microsecond level (e.g., nano-second level), may be accessed in either case.

Figure 9:
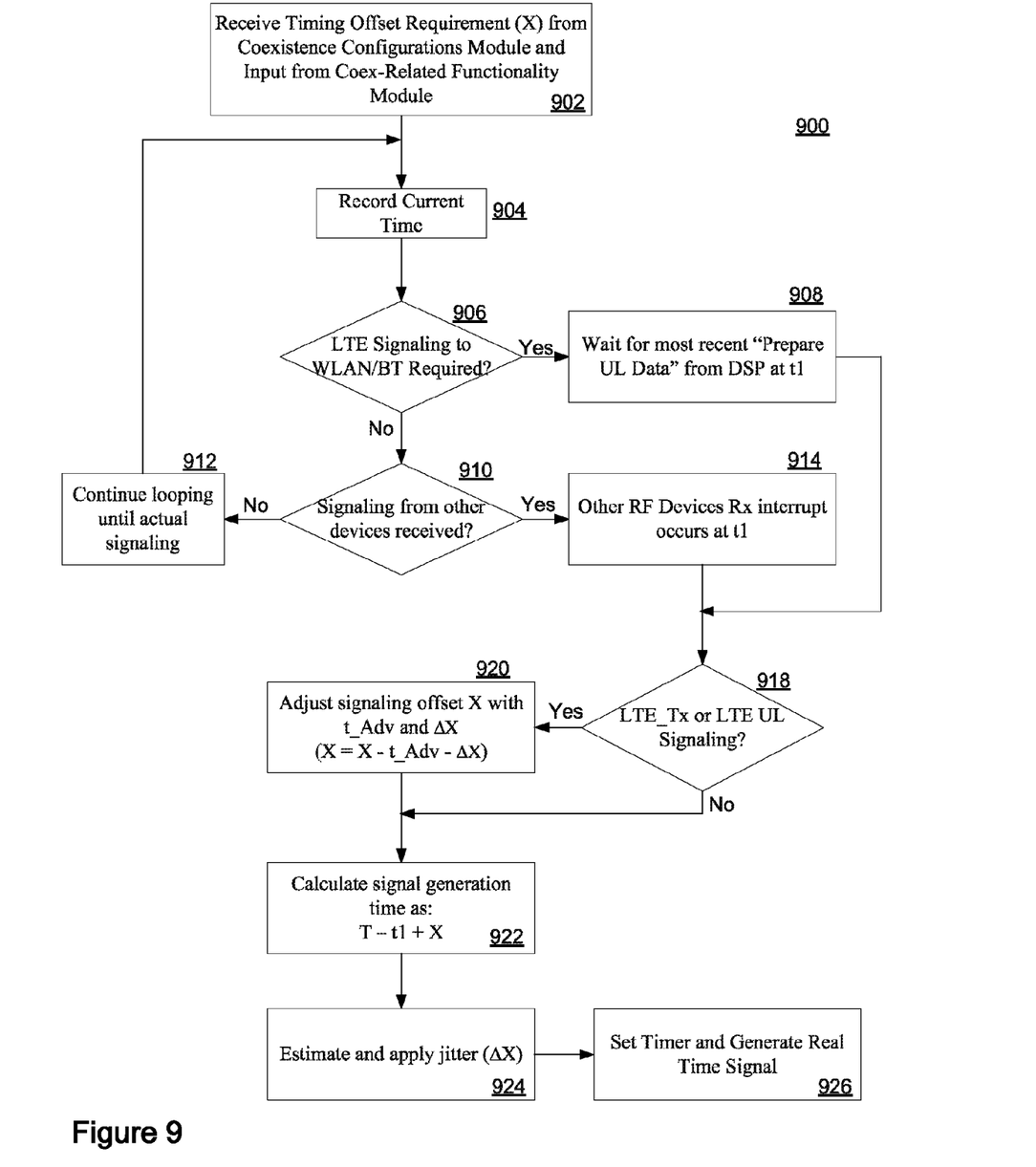
FIG. 9 is a flow chart illustrating an example coexistence signaling process.

Referring now to FIG. 9, an example coexistence signaling process 900 is illustrated. In various embodiments, the process 900 may be executed by, for example, the coexistence algorithm module 310 of FIG. 8. The coexistence process 900 can start at, for example, re-boot or power up of the communication device 110 (block 902). The start process may include accessing the coexistence real-time signaling/configurations module 340 to retrieve, for example, timing offset requirements for the various signals. A fixed offset X may be set in accordance with LTE receiving and transmitting behaviors, regardless of the location or mobility of the communication device 110.

Additionally, the coexistence algorithm module 310 may access the coexistence-related functionality 350 to retrieve, for example, HARQ acknowledgment time, DRX wakeup time, uplink/downlink scheduling grant time, frame configuration and uplink/downlink time relevance, for example. The current time may then be recorded (block 904). Initially, the current time can be 0.

The coexistence algorithm module 310 may then determine if the LTE subsystem 220 requires coexistence signaling to another RF subsystem, such as the WLAN subsystem 230 or the Bluetooth® subsystem 240, for example (block 906). If the LTE subsystem 220 does not require coexistence signaling to other RF subsystems, the coexistence algorithm module 310 can then determine if coexistence signaling is received by the LTE subsystem 220 from another RF subsystem, such as the WLAN subsystem 230 or the Bluetooth® subsystem 240 (block 910). If no such signals are received, the coexistence algorithm module 310 can then continue looping (block 912) back to block 904 until actual signaling is received.

If, at block 906, the coexistence algorithm module 310 determines that the LTE subsystem 220 requires signaling to another RF subsystem, the coexistence algorithm module 310 may wait for the most recent interrupt from the DSP module 335 (block 908). Upon the interrupt, the coexistence algorithm module 310 can execute a coexistence signaling algorithm for an event occurring at a future time T (blocks 918-924). In this regard, the coexistence algorithm module 310 may access the coexistence real-time signaling/configurations module 340 and the coexistence-related functionality 350.

Similarly, at block 910, if the coexistence algorithm module 310 determines that the LTE subsystem 220 is receiving coexistence signaling from another RF subsystem, an Rx or Tx interrupt for the other RF subsystem can occur at time t1 (block 914). Upon the interrupt, the coexistence algorithm module 310 can execute the coexistence signaling algorithm for an event occurring at a future time T (blocks 918-924).

If the coexistence signaling indicates either an LTE subsystem transmitting or an LTE subsystem uplinking (block 918), the coexistence algorithm module 310 can adjust the timing offset to account for location-based variation between the communication device 110 and the eNB (block 920). As described above, the offset can be adjusted by a t_adv value based on the location and further adjusted by an estimated jitter ΔX. In this regard, the coexistence algorithm module 310 may access input from the eNB. For example, online measurements may be used to determine the appropriate t_adv, as illustrated in the examples of FIGS. 6 and 7.

The coexistence algorithm module 310 may then calculate the time at which the signal should be generated (block 922). In this regard, the signal may be an LTE transmit, LTE receive or a FRAME_SYNC signal. The signal generation time can be calculated as the event time T minus the current time t1 plus the timing offset X.

At block 924, the signal generation jitter time (ΔX) may be estimated. In this regard, ΔX may be based on the signaling generation and processing delay inside the processor. The coexistence algorithm module 310 can then set the timer and generate the real-time signal when the timer reaches 0 (block 926).

Thus, the coexistence-related functionality 350 can provide timing information and Rx/Tx scheduling for generating RT signals in any arbitrary future. These can become the inputs to the signal generation algorithm, which can receive or generate predictive signaling with a fixed offset to the expected behavior of the subsystems. Timing adjustments for propagation variation due to location can be made with input from, for example, the eNB and are made in real-time.

While FIGS. 8 and 9 illustrate a sample coexistence signaling algorithm operating in the LTE subsystem 220, those skilled in the art will understand that a similar algorithm may operate in one or more of the other RF subsystems (i.e. WLAN subsystem 230, Bluetooth® subsystem 240, and/or GNSS subsystem 250).

While various embodiments of the present disclosure have been described above in the context of a wireless communication device operative in adjacent LTE and ISM bands, it should be understood that they have been presented by way of example only, and not of limitation. For example, the systems and methods described herein may be applied to the same or other communication standards operative in adjacent or otherwise coexistent frequency bands, such as certain LTE and Global Navigation Satellite Systems (GNSS) bands. It should be further understood that more or less circuitry, elements, such as radios, filters, switches, etc. may be implemented in a wireless communication device to effectuate communications over a variety of standards, protocols, etc. in accordance with various embodiments.

Likewise, the various diagrams may depict an example architectural or other configuration for the various embodiments, which is done to aid in understanding the features and functionality that can be included in embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, application-specific integrated circuits (ASICs), programmable logic arrays (PLAs), programmable array logic (PALs), complex programmable logic devices (CPLDs), field-programmable gate arrays (FPGAs), logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:
1. An apparatus, comprising:
a plurality of radio frequency (RF) subsystems configured to receive or transmit communication signals; and
an interface for communication between a first RF subsystem of the plurality of RF subsystems and a second RF subsystem of the plurality of subsystems;
wherein the first RF subsystem is configured to generate a timing offset for a coexistence signal, the timing offset being indicative of a difference between a time of gen- eration of a signal and the time of an event associated with the signal, wherein the timing offset comprises:
an offset adjustment based on a distance between the apparatus and a base station associated with the first RF subsystem.

2. The apparatus of claim 1, wherein the first RF subsystem is a Mobile Wireless Standards (MWS) subsystem.

3. The apparatus of claim 1, wherein the second RF subsystem is one of a wideband local area network (WLAN) subsystem or a Bluetooth subsystem.

4. The apparatus of claim 1, wherein the coexistence signal is associated with one of a transmission by the first RF subsystem, a reception by the first RF subsystem, or a frame synchronization for a reception or transmission by the second RF subsystem.

5. The apparatus of claim 4, wherein the coexistence signal indicates an assertion of priority by one of the plurality of RF subsystems.

6. The apparatus of claim 1, further comprising a fine resolution timer, the timer being associated with the periodic interrupt.

7. The apparatus of claim 1, wherein the timing offset further includes an estimated jitter based on a processing time or a processing delay.

8. The apparatus of claim 1, wherein the timing offset further comprises:
a first offset independent at least of a location of the apparatus.

9. The apparatus of claim 8, wherein the first RF subsystem is configured to generate the first offset by accessing signaling configuration information.

10. The apparatus of claim 8, wherein the first offset is generated based on at least one of a reference time from a periodic interrupt or direct access of a timer.

11. The apparatus of claim 8, wherein the first offset is a fixed offset.

12. A method, comprising:
generating a timing offset for a coexistence signal, the timing offset being indicative of a difference between a time of generation of a signal and the time of an event associated with the signal,
the timing offset comprising an offset adjustment based on a distance between a present location and a base station; and
determining a signal generation time based at least in part on the offset adjustment.

13. The method of claim 12, wherein the base station is associated with a Mobile Wireless Standards (MWS) subsystem.

14. The method of claim 12, wherein the coexistence signal is associated with one of a transmission by a first RF subsystem, a reception by the first RF subsystem, or a frame synchronization for a reception or transmission by a second RF subsystem.

15. The method of claim 12, wherein the coexistence signal indicates an assertion of priority by one of a plurality of RF subsystems.

16. The method of claim 12, wherein the periodic interrupt is based on a fine resolution timer.

17. The method of claim 12, wherein the timing offset further comprises a first offset based on at least one of a reference time from a periodic interrupt or a direct access of a timer.

18. The method of claim 17, wherein the first offset is generated by accessing signaling configuration information.

19. The method of claim 17, wherein the first offset is a fixed offset.

20. A computer program product, embodied on a non-transitory computer-readable medium, comprising:
computer code for generating a timing offset for a coexistence signal, the timing offset being indicative of a difference between a time of generation of a signal and the time of an event associated with the signal,
wherein the timing offset comprises an offset adjustment based on a distance between a present location and a base station; and
computer code for determining a signal generation time based at least in part on the offset adjustment.

21. The computer program product of claim 20, wherein the base station is associated with a Mobile Wireless Standards (MWS) subsystem.

22. The computer program product of claim 20, wherein the coexistence signal is associated with one of a transmission by a first RF subsystem, a reception by the first RF subsystem, or a frame synchronization for a reception or transmission by a second RF subsystem.

23. The computer program product of claim 20, wherein the coexistence signal indicates an assertion of priority by one of a plurality of RF subsystems.

24. The computer program product of claim 20, wherein the timing offset further comprises a first offset based on at least one of a reference time from a periodic interrupt or a direct access of a timer.

25. The computer program product of claim 24, wherein the first offset is generated by accessing signaling configuration information.

26. The computer program product of claim 24, wherein the first offset is a fixed offset.

* * * * *